(12) United States Patent
Bell et al.

(10) Patent No.: US 6,199,891 B1
(45) Date of Patent: Mar. 13, 2001

(54) TRAILER SAFETY HITCH

(75) Inventors: Farron L. Bell; Michael G. Bell, both of Enid; Charles M. Lynn, Ames, all of OK (US)

(73) Assignee: BTH L.L.C., Enid, OK (US)

(*) Notice: Subject to any disclaimer, the term of this patent is extended or adjusted under 35 U.S.C. 154(b) by 0 days.

(21) Appl. No.: 09/175,917

(22) Filed: Oct. 20, 1998

Related U.S. Application Data

(60) Provisional application No. 60/063,107, filed on Oct. 24, 1997.

(51) Int. Cl.[7] .................................................. B60T 7/12
(52) U.S. Cl. ..................... 280/507; 280/511; 280/432; 280/514
(58) Field of Search ........................... 280/432, 506, 280/507, 511, 514, 907

(56) References Cited

U.S. PATENT DOCUMENTS

| | | | |
|---|---|---|---|
| 2,088,991 | 8/1937 | Berchtold | 280/33.15 |
| 2,448,744 * | 9/1948 | Strader | 280/507 |
| 2,515,856 * | 7/1950 | Brougher | 280/507 |
| 2,614,861 | 10/1952 | Van Horn | 280/33.15 |
| 2,650,101 | 8/1953 | Frankfother | 280/33.9 |
| 2,788,990 | 4/1957 | Barcafer | 280/457 |
| 2,815,225 | 12/1957 | Barcafer | 280/457 |
| 2,998,982 | 9/1961 | Brazil | 280/457 |
| 3,123,383 | 3/1964 | Humpal | 280/457 |
| 3,125,355 | 3/1964 | Snuggins | 280/457 |
| 3,265,407 | 8/1966 | Paddock | 280/457 |
| 3,341,226 | 9/1967 | Broun | 280/457 |
| 3,400,948 | 9/1968 | Matson | 280/406 |
| 3,471,170 | 10/1969 | Rendessy | 280/446 |
| 3,549,173 | 12/1970 | Stanfield | 280/457 |
| 3,770,298 | 11/1973 | Phillips | 280/457 |
| 3,782,762 * | 1/1974 | Nagy et al. | 280/507 |
| 3,827,722 | 8/1974 | Miller et al. | 280/432 |
| 3,900,214 | 8/1975 | Brockelsby | 280/414 R |
| 4,428,596 * | 1/1984 | Bell et al. | 280/507 |
| 5,131,796 * | 7/1992 | Herum et al. | 411/222 |
| 5,154,440 * | 10/1992 | Dolan et al. | 280/507 |
| 5,186,483 * | 2/1993 | Sheppard | 280/494 |
| 5,280,941 * | 1/1994 | Guhlin | 280/507 |
| 5,322,316 * | 6/1994 | Wheeler | 280/507 |
| 5,378,008 * | 1/1995 | McCrossen | 280/507 |
| 5,476,281 * | 12/1995 | Worthington | 280/507 |
| 5,482,309 * | 1/1996 | Hollis | 280/507 |
| 5,513,871 * | 5/1996 | Johnson | 280/507 |
| 5,700,024 * | 12/1997 | Upchurch | 280/507 |
| 5,743,548 * | 4/1998 | Gaspard | 280/507 |

* cited by examiner

*Primary Examiner*—Eric Culbreth
*Assistant Examiner*—L. Lum
(74) *Attorney, Agent, or Firm*—Dunlap, Codding & Rogers, P.C.

(57) ABSTRACT

A safety connector for securing a trailer to a towing vehicle having a trailer hitch mounting member. The safety connector includes a trailer hitch adapted to be secured to the trailer hitch mounting member of the towing vehicle. The trailer hitch has a lower portion adapted to extend a distance below the trailer hitch mounting member when the trailer hitch is secured to the trailer hitch mounting member. A spool is connected to the lower portion of the trailer hitch such that the spool is positionable below the trailer hitch mounting member. The spool has a first shoulder portion spaced a distance away from the trailer hitch mounting member, and a medial portion positioned in between the first shoulder portion and trailer hitch mounting member. The medial portion has a diameter less than the diameter of the first shoulder portion. A base plate is connectable to the trailer. The base plate has a thickness less than a length of the medial portion, and a slot formed therethrough. The slot has a width less than the diameter of the first shoulder portion of the spool but greater than the diameter of the medial portion of the spool, and a length greater than the diameter of the medial portion of the spool whereby the base plate is freely slidable along and rotatable about the medial portion of the spool.

20 Claims, 6 Drawing Sheets

TRAILER SAFETY HITCH

CROSS REFERENCE TO RELATED APPLICATIONS

This application claims the benefit of U.S. Provisional Application Ser. No. 60/063,107, filed Oct. 24, 1997.

STATEMENT REGARDING FEDERALLY SPONSORED RESEARCH OR DEVELOPMENT

Not Applicable.

BACKGROUND OF THE INVENTION

The conventional type of trailer hitch that is in widespread use includes a trailer hitch which is mounted on a vehicle which is to tow a trailer. A socket formed in the tongue of the trailer receives a portion of the trailer hitch once the socket has been placed onto such trailer hitch. A locking mechanism is then provided on the trailer tongue to maintain the trailer hitch in the socket. While the ball and socket type trailer hitch systems are very convenient to a user, problems have arisen with the use of this type of system. A well known danger that exists with regard to these systems is that the locking mechanism and the trailer tongue can work loose while the trailer is being towed. If this occurs, the trailer can separate from the towing vehicle to become a danger to persons using the public thoroughfare along which the trailer and towing vehicle are moving.

Because of this danger, a number of states require that the ball and socket hitch be supplemented by chains that connect the trailer to the vehicle so that should the ball become dislodged from the socket, the trailer and towing vehicle will remain connected. Thus, the driver of the towing vehicle will retain at least some control over the movement of the trailer, and it is hoped, be able to bring the trailer and towing vehicle safely to a halt. Unfortunately, these hopes are often not realized and practiced. Because of the flexibility of the chains, the driver's control over the movements of the towing vehicle and trailer may be very limited. For example, the chains may have been connected in such a way that the front end of the trailer can undergo rapid side to side movements that make it very difficult for the driver of the towing vehicle to maintain control of the trailer as the driver brings them to a halt. Thus, while the chains may prevent the trailer from breaking loose from the towing vehicle, it may do so at the expense of causing the combined vehicle and trailer system to become a danger which is equal or greater than the danger that would be presented by a freely moving trailer.

Although attempts have been made to provide a trailer safety hitch which alleviates the before mentioned problems of the safety chains, such attempts have either required a specialized trailer hitch or are difficult and costly to use. Thus, a need exists for a trailer safety hitch which substantially uses a commercially available trailer hitch to provide a less costly and more desirable trailer safety hitch. It is to such an improved trailer safety hitch which the present invention is directed.

DETAILED DESCRIPTION OF THE INVENTION

Figure 1:
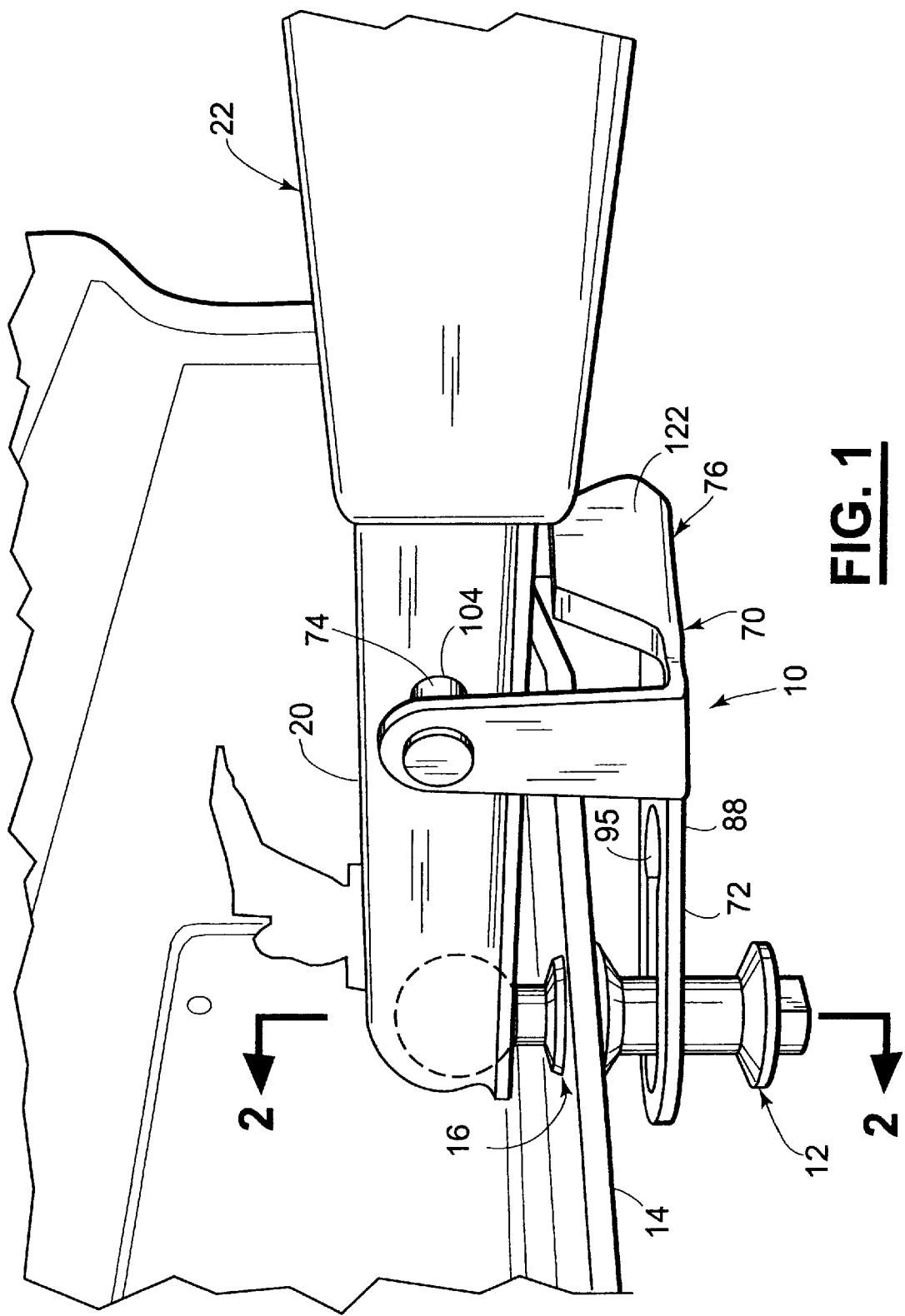
FIG. 1 is a perspective view of the trailer safety hitch of the present invention having portions non-pivotally mounted to the tongue of a trailer and other portions movably disposed on a trailer hitch assembly mounted to the towing vehicle.

Referring now to the drawings and to FIG. 1 in particular, shown therein and designated by the general reference numeral 10 is a trailer safety hitch constructed in accordance with the present invention. The trailer safety hitch 10 is provided with a trailer hitch assembly 12 which can be mounted to a towing vehicle 14. It should be understood that the trailer hitch assembly 12 can be attached to the towing vehicle 14 by any suitable method, such as by disposing a portion of the trailer hitch assembly 12 through an aperture provided in the towing vehicle 14, or any other suitable method of attaching the trailer hitch assembly 12 to the towing vehicle 14.

Figure 2:
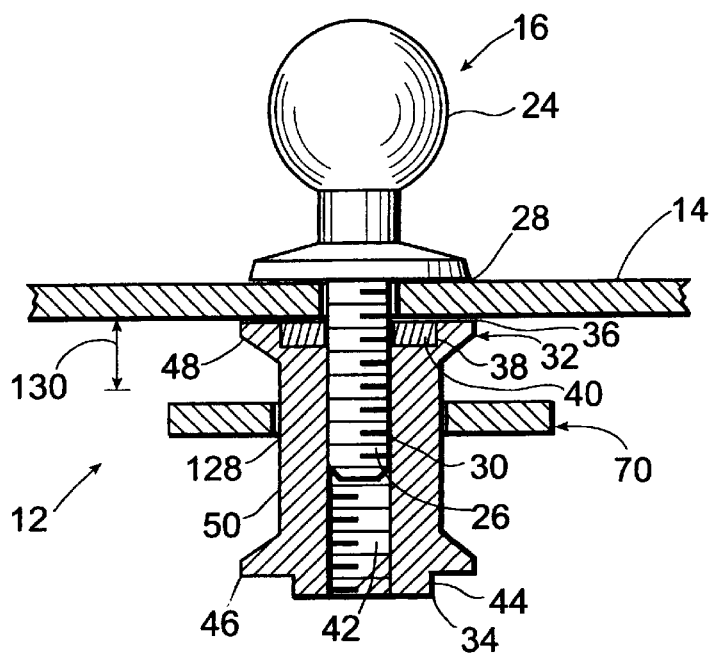
FIG. 2 is a cross sectional view of the trailer hitch assembly depicted in FIG. 1, taken along the lines 2—2.

Referring now to FIG. 2 in combination with FIG. 1, shown therein in more detail is the trailer hitch assembly 12. The trailer hitch assembly 12 is provided with a trailer hitch 16. The trailer hitch 16 can be any suitable trailer hitch, such as a commercially available ball type trailer hitch adapted to be disposed in a socket 18 provided in the tongue 20 of a trailer 22.

The trailer hitch 16 includes an upper portion 24 and a lower portion 26. The upper portion 24 of the trailer hitch 16 is adapted to be connected to the tongue 20 of the trailer 22. The lower portion 26 can be disposed through an aperture 28 provided through a portion of the towing vehicle 14 such that an externally threaded portion 30 of the lower portion 26 extends a distance from the towing vehicle 14, substantially as shown in FIG. 2.

The trailer hitch assembly 12 is further provided with a spool assembly 32 attached to the lower portion 26 of the trailer hitch 16 and extending downwardly from the underside of the towing vehicle 14. The spool assembly 32 has a first end 34 and a second end 36. An annular opening 38 is provided through the second end 36 of the spool assembly 32 and extends a distance towards the first end 34 thereof. The annular opening 38 is adapted to receive a lock washer 40 therein such that a portion of the lock washer 40 can engage a portion of the towing vehicle 14 to prevent the spool assembly 32 from becoming loose due to vibration, for example..mb A threaded bore 42 extends through the spool assembly 32 from the annular opening 38 to the first end 34 thereof. In the embodiment shown in FIG. 2, the externally threaded portion 30 of the lower portion 26 of the trailer hitch 16 is threadingly received by the threaded bore 42 of the spool assembly 32 so as to maintain the trailer hitch assembly 12 on the towing vehicle 14. A portion 44 of the spool assembly 32 near the first end 34 thereof is adapted to receive a suitable wrench (not shown) to tighten the spool assembly 32 onto the trailer hitch 16 to maintain the spool assembly 32 and the trailer hitch 16 in a stable position on the towing vehicle 14.

The spool assembly 32 is provided with a first annular shoulder portion 46 and a second annular shoulder portion 48. The first shoulder portion 46 is disposed near the first end 34 of the spool assembly 32, and the second shoulder portion 48 is disposed near the second end 36 of the spool assembly 32..mb The second shoulder portion 48 of the spool assembly 32 engages the towing vehicle 14 when the spool assembly 32 is disposed on the trailer hitch 16. The spool assembly 32 has a generally cylindrically shaped medial portion 50 disposed between the first shoulder portion 46 and the second shoulder portion 48. The medial portion 50 has a diameter (not shown) which is less than the diameters of the first shoulder portion 46 and the second shoulder portion 48.

The spool assembly 32 and the trailer hitch 16 of the trailer hitch assembly 12 can be constructed of any suitable rigid material, such as steel. It should be noted that the spool assembly 32 is adapted to generally replace the nut (not shown) provided as standard equipment on commercially available ball type trailer hitches.

Figure 3:
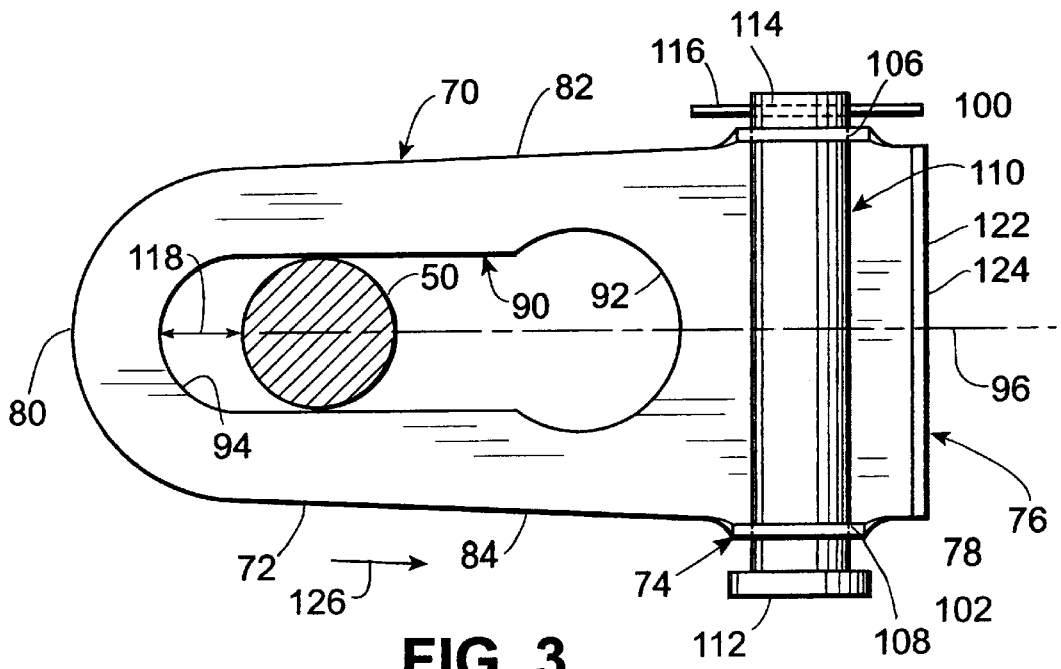
FIG. 3 is a plan view of the safety connector of the trailer safety hitch of FIG. 1.

Returning now to FIG. 1, the safety hitch 10 further comprises a safety connector 70 which is shown in more detail in FIG. 3. The safety connector 70, in turn, generally comprises: (1) a base plate 72 which is disposed on the medial portion 50 of the spool assembly 32; (2) a pinning assembly 74 by means of which the tongue 20 of the trailer 22 is pivotally connected to the base plate 72; and (3) a pivotational limiting assembly 76 for limiting the degree of pivotation of the base plate 72 relative to the tongue 20. As shown in the drawings, the pivotational limiting assembly 76 can be formed integrally with the base plate 72 such that the pivotational limiting assembly 76 is an extension of the base plate 72 from a rear end 78 of the base plate 72 indicated by a dashed line in FIG. 3.

The base plate 72 is formed of plate metal or other rigid material and has a forward end 80 opposite the rear end 78 thereof. The base plate 72 is further provided with opposed first and second sides 82 and 84 respectfully, and upper and lower surfaces 86 and 88 (FIG. 1) respectfully. Near the forward end 80 of the base plate 72, an elongated slot 90 (FIG. 3) is formed through the base plate 72 to intersect the upper and lower surfaces 86 and 88 thereof. The slot 90 has a first end 92, a second end 94 and is preferably disposed longitudingly along a front to rear axis 96 of the base plate 72. The slot 90 has the general form of a key hole; portions of the slot 90 adjacent the first end 92 thereof being larger than portions of the slot 90 adjacent the second end 94 thereof. In particular, portions of the slot 90 adjacent the first end 92 are dimensioned such that these portions can be placed over (or dimensioned to receive) the first shoulder portion 46 of the spool assembly 32 to position the base plate 72 about the medial portion 50 of the spool assembly 32. Portions of the slot 90 adjacent the second end 94 thereof, on the other hand, are dimensioned to be slidably movable in a rotating direction and a vertical direction on the cylindrically shaped medial portion 50 so that the base plate 72 and the medial portion 50 can move relative to each other when the towing vehicle 14 is turning a corner, for example, and when the towing vehicle 14 and the trailer 22 are traversing uneven terrain, such as hills or driveways. However, portions of the slot 90 near the second end 94 thereof are dimensioned to not pass the first shoulder portion 46 or the second shoulder portion 48 so that the base plate 72 is maintained on the medial portion 50 thereby. In other words, the second end 94 of the slot 90 has a width which is slightly greater than the diameter of the medial portion 50, but which is less than the diameters of the first and second shoulder portions 46 and 48 to permit the base plate 72 to be mounted on the trailer hitch assembly 12 in a stable or captured position by placing portions of the slot 90 adjacent the first end 92 thereof over the first or second shoulder portions 46 or 48 and then by moving the base plate 72 rearwardly to dispose portions of the base plate 72 about the second end 94 of the slot 90 about the medial portion 50 of the spool assembly 32.

Preferably, and as shown in FIG. 3, the second end 94 of the slot 90; that is, the smaller end of the slot 90, is positioned adjacent the forward end 80 of the base plate 72 and the first, or larger end 92 of the slot 90 is positioned rearwardly of the second end 94 thereof. Such positioning of the slot 90 in the base plate 72, as well as the general disposition of the slot 90 along the front to rear axis 96, provides the safety connector 70 with a compact structure as will be clear from the discussion of the use of the safety connector 70 to follow.

The pinning assembly 74 comprises a pair of lugs 100 and 102 which are preferably unitarily connected to the base plate 72 at the sides 82 and 84 and adjacent the rear end 78 thereof. The lugs 100 and 102 extend upwardly from the upper surface 86 of the base plate 72 in a substantially parallel, spaced apart relation such that the tongue 20 of the trailer 22 can be disposed between the lugs 100 and 102. A transverse hole 104 (FIG. 1) is formed through the tongue 20 and aligned apertures 106 and 108 are formed through the lugs 100 and 102, respectively, so that the base plate 72 can be pivotally connected to the tongue 20 via the pinning assembly 74. For this purpose, the pinning assembly 74 further comprises a pin 110 adapted to be inserted through the apertures 106 and 108 and the hole 104 after the tongue 20 of the trailer 22 is positioned between the lugs 100 and 102. In order to retain the pin 110 within the apertures 106, 108 and the hole 104, an outwardly extending flange 112 can be formed on the pin 110 near one end thereof and a hole 114 can be formed through the pin 110, near the other end thereof to receive a removable retainer 116, such as a conventional piece of wire or a lock.

An important aspect of the invention lies in a relationship between the relative positions of the spool assembly 32 in the elongated slot 90 when the safety connector 70 is pinned to the tongue 20 via the pinning assembly 74. That is, as shown in FIG. 3, a gap 118 of about ¾ inches is provided between a front portion 120 of the medial portion 50 of the spool assembly 32 and the second end 94 of the elongated slot 90. The gap 118 permits the base plate 72 of the safety connector 70 to move in the vertical direction (as indicated by the arrow 121 in FIG. 2) when the towing vehicle 14 and the trailer 22 are traveling over uneven terrain, such as steep grades, driveways or curbs so that the trailer hitch assembly 12 and the tongue 20 are not bound and fatigued during the towing of the trailer 22. In addition, the circular cross section of the medial portion 50 permits the trailer hitch assembly 12 to rotate without interference between the medial portion 50 and the base plate 72 when the towing vehicle is turning, for example. In addition, the close dimensions between this elongated slot 90 near the second end 94 thereof and the medial portion 50 substantially prevents the trailer 22 from rocking, and thus turning over while the trailer 22 is being towed by the towing vehicle 14. That is, these close dimensions cause the rigid medial portion 50 to engage the rigid safety connector 70 when the trailer 22 begins to tilt, and thereby exerts an opposite force on the trailer 22 to prevent it from rolling over.

The pivotational limiting assembly 76 is provided to prevent pivotation of the tongue 20 on the safety connector 70 sufficient to permit the socket 18 to lift off the trailer hitch 16 once the safety connector 70 has been mounted on the trailer hitch assembly 12, with the medial portion 50 disposed in the slot 90 near the small second end 94 thereof. As shown in FIGS. 1 and 3, the pivotational limiting assembly 76 comprises a plate like member 122 that extends rearwardly of the base plate 72 and has an upturned heel portion 124 extending from the base plate 72 to engage the tongue 20.

Should the tongue 20 of the trailer 22 move in a direction that would tend to lift the socket 18 off the trailer hitch 16, the base plate 72 will engage portions of the second shoulder portion 48 which will cause the upturned heel portion 124 of the pivotational limiting assembly 76 to engage the tongue 20 and thereby prevent the socket 18 of the tongue 20 from lifting off of the trailer hitch 16. Thus, once the safety connector 70 is disposed about the medial portion 50 of the spool assembly 32, and the safety connector 70 is pivotally connected to the tongue 20 via the pinning assembly 74, the engagement between the socket 18 and trailer hitch 16 prevents the safety connector 70 from moving in a forward direction to dislodge the safety connector 70 from the spool assembly 32. Likewise, the construction of the safety connector 70 prevents the trailer hitch 16 from being removed from the socket 18 of the tongue 20. Thus, the tongue 20 of the trailer 22 is securely and rigidly fastened to the trailer hitch assembly 12 to prevent separation of the trailer 22 from the towing vehicle 14.

The safety connector 70 can also function as a theft deterrent when the removable retainer 116 is a lock. At such times that the trailer 22 is not to be towed, the safety connector 70 can be connected to the tongue 20 via the pinning assembly 74 so that portions of the elongated slot 90 near the small second end 94 thereof are disposed generally below the socket 18. In this position, the trailer hitch 16 cannot be disposed in the socket 18 until the safety connector 70 has been removed from the tongue 20 because the small second end 94 is also dimensioned to not pass the trailer hitch 16 therethrough. In addition, at such times that the safety connector 70 is installed on the tongue 20 when the tongue 20 is connected to the trailer hitch 16 (as best shown in FIG. 1), the tongue 20 cannot be removed from the trailer hitch 16 until the safety connector 70 has been removed therefrom. This prevents the unauthorized use or theft of the trailer 22 until the safety connector 70 has been removed.

When it is desired to tow the trailer 22, the removable retainer 116 is removed from the pin 110 and the pin 110 is removed from the lugs 100 and 102 and the hole 104 so that the safety connector 70 can be removed from the tongue 20 of the trailer 22. The tongue 20 is then connected to the trailer hitch 16 in a conventional manner. Once the trailer 22 is hitched to the towing vehicle 14, the safety connector 70 is then mounted on the spool assembly 32 by passing the first shoulder portion 46 through the elongated slot 90 near the first end 92 thereof such that the base plate 72 is disposed generally about the medial portion 50 of the spool assembly 32. The safety connector 70 is then moved in a direction toward the trailer 22 as indicated by the arrow 126 (FIG. 3) until portions of the elongated slot 90 near the second end 94 thereof are disposed about the medial portion 50 and the gap 118 exists. The aligned apertures 106 and 108 of the lugs 100 and 102 are then aligned with the transverse hole 104. In this position, the pin 110 is inserted through the aligned aperture 106, the transverse hole 104 and the aligned aperture 108 until a portion of the pin 110 having the hole 114 is disposed generally past the lug 102. The removable retainer 116 is then disposed through the hole 114 to maintain the pin 110 in a stable position in the aligned apertures 106 and 108 and the transverse hole 104. The towing vehicle 14 and the trailer 22 are then in a condition for the towing vehicle 14 to tow the trailer 22.

It should be noted that the safety connector 70 is preferably mounted such that the base plate 72 is disposed near a central portion 128 between the first and second shoulder portions 46 and 48 of the spool assembly 32 when the towing vehicle 14 and the trailer 22 are disposed on level terrain. This insures that the base plate 72 will have adequate room to travel between the first shoulder portion 46 and the second shoulder portion 48 as the towing vehicle 14 and the trailer 22 are moved about uneven terrain such as steep grades, driveways or curbs.

It should also be noted that the spool assembly 32 is designed to prevent the removal of the spool assembly 32 from the trailer hitch 16 when the safety connector 70 is in an installed position on the trailer hitch assembly 12 and the tongue 20. That is, the second shoulder portion 48 is provided with a length 130 which is sufficient to cause a lower portion of the second shoulder portion 48 to engage the base plate 72 of the safety connector 70 when the spool assembly 32 is being moved away from the towing vehicle 14 (such as when the spool assembly 32 is being unscrewed from the externally threaded portion 30 of the lower portion 26 of the trailer hitch 16). The engagement between the second shoulder portion 48 and the base plate 72 when the spool assembly 32 is being removed causes the base plate 72 to pivot about the pinning assembly 74 which also causes the upturned heel portion 124 of the pivotational limiting assembly 76 to engage the tongue 20 and thereby prevent the base plate 72 from being moved. This makes it practically impossible to remove the trailer hitch assembly 12 from the towing vehicle 14 when the trailer 22 is connected to the towing vehicle 14 and the safety connector 70 is in an installed position on the spool assembly 32 and the tongue 20 without destruction of at least one of the components of the trailer hitch assembly 12 or the safety connector 70.

Figure 4:
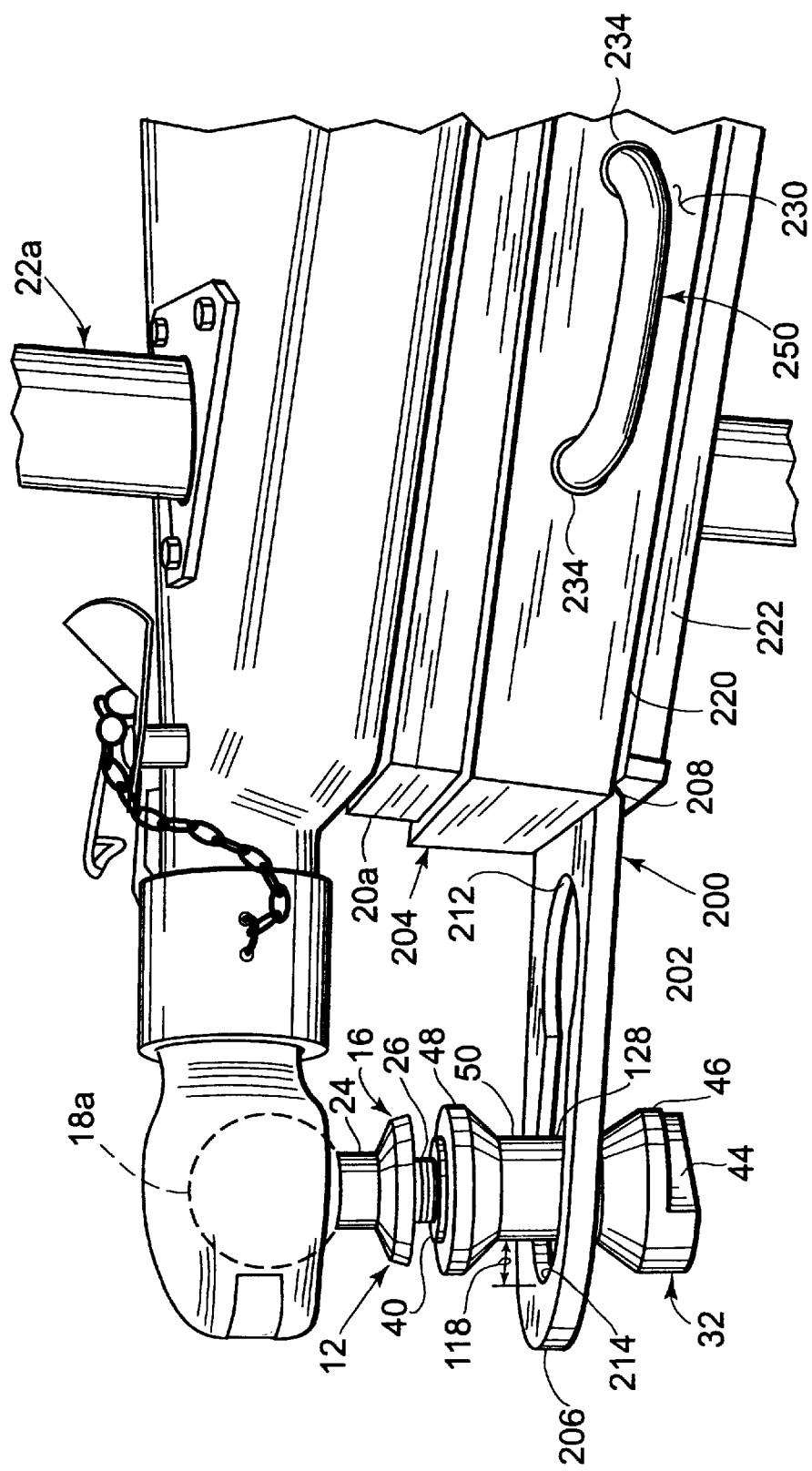
FIG. 4 is a perspective view of a second embodiment of a safety connector constructed in accordance with the present invention with the safety connector being disposed on and connected to the tongue of a trailer.
Figure 5:
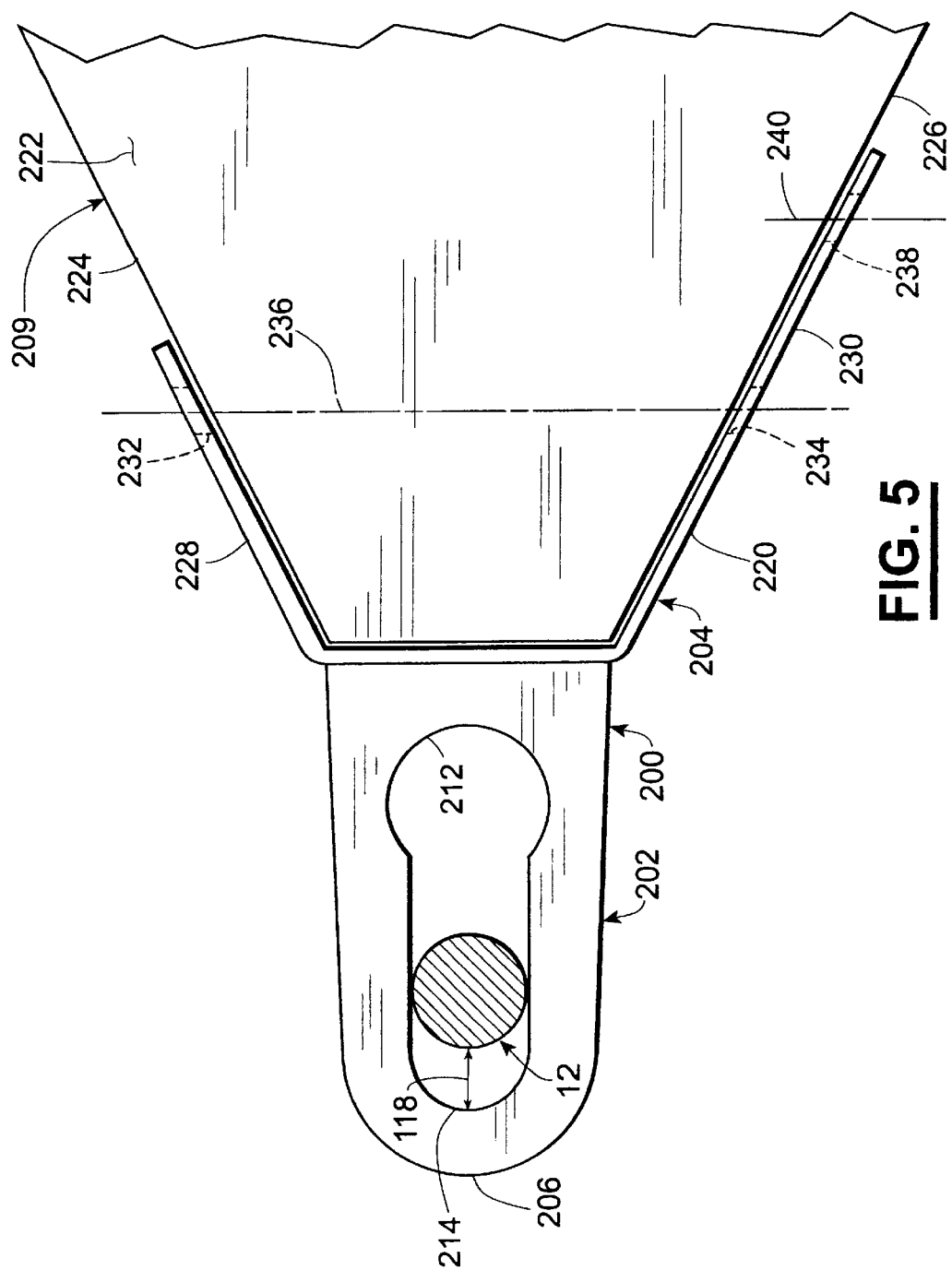
FIG. 5 is a plan view of the safety connector depicted in FIG. 4.
Figure 6:
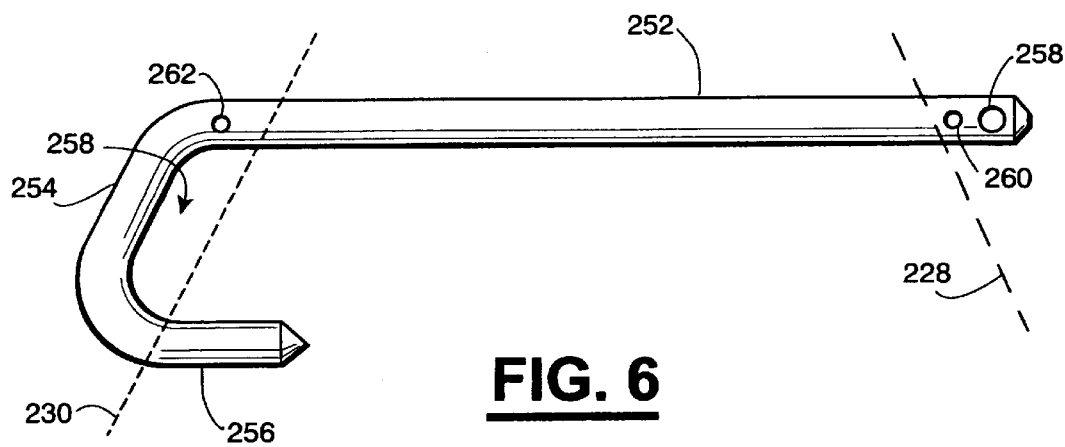
FIG. 6 is a plan view of a J-shaped pin constructed in accordance with the present invention which is utilized to connect the second embodiment of the safety connector depicted in FIG. 5 to the tongue of the trailer as depicted in FIG. 4.

Shown in FIGS. 4–6 and designated by the general reference numeral 200 is another embodiment of a safety connector constructed in accordance with the present invention which can be used in conjunction with the trailer hitch assembly 12 which was described in detail hereinbefore with reference to FIG. 2. The safety connector 200 is adapted to be disposed about at least a portion of a tongue 20a of a trailer 22a. The safety connector 200 is provided with a base plate 202 and a coupling assembly 204. The coupling assembly 204 is adapted to rigidly (non pivotally) and removably connect the base plate 202 to at least a portion of the tongue 20a such that the base plate 202 extends forwardly of the coupling assembly 204 so that at least a portion of the base plate 202 extends generally below a socket 18a provided in the tongue 20a of the trailer 22a.

The base plate 202 has a first end 206, a second end 208 opposed from the first end 206 thereof and a key-shaped elongated slot 210 formed through the base plate 202 substantially as shown in FIGS. 4 and 5. The elongated slot 210 has a first end 212 and a second end 214. The elongated slot 210 is constructed and positioned relative to the trailer hitch assembly 12 in an identical manner as the elongated slot 90 hereinbefore described with reference to FIG. 3. Thus, no more comments are deemed necessary to teach one of ordinary skill in the art how to make and use the elongated slot 210. The base plate 202 is preferably constructed of a rigid material, such as steel.

The coupling assembly 204 is provided with a coupling member 220 which can be removably and rigidly connected to the tongue 20a of the trailer 22a. The coupling member 220 is preferably constructed of a rigid material, such as steel. The coupling member 220 is connected to the second end 208 of the base plate 202. Preferably, the coupling member 220 is shaped to conform to the contours of a lower portion 222 of the tongue 20a of the trailer 22a.

As best shown in FIG. 5, the lower portion 222 of the tongue 20a is provided with a first side 224 and a second side 226 which is opposed from the first side 224 thereof.

The coupling member 220 is provided with a first arm member 228 disposed substantially adjacent the first side 224, and a second arm member 230 disposed substantially adjacent the second side 226. The first arm member 228 has a length which is less than the length of the second arm member 230. The first arm member 228 and the second arm member 230 are provided with aligned apertures 232 and 234, respectively. The aligned apertures 232 and 234 are aligned with a transverse hole 236 (which is represented in FIG. 5 by the dashed line) extending generally between the first and second sides 224 and 226 thereof.

The second arm 230 is provided with a second aperture 238 which is spaced a distance from the aperture 234. The second aperture 238 is aligned with a second transverse hole 240 (which is represented in FIG. 5 by a line) extending generally through the second side 226 of the tongue 20a. The aligned apertures 232 and 234, the transverse hole 236, the second aperture 238 and the second transverse hole 240 are all adapted to receive predetermined portions of a pin 250 which is best shown in FIG. 6.

The pin 250 is provided with a first shaft member 252, a second shaft member 254 and a third shaft member 256 constructed and connected substantially as shown in FIG. 6. The first shaft member 252 can be positioned through the aligned apertures 232 and 234 and the transverse hole 236 when the coupling member 220 is disposed on the lower portion 222 of the tongue 20a. The third shaft member 256 can be positioned through the second aperture 238 and the second transverse hole 240 when the first shaft member 252 is being positioned through the aligned apertures 232 and 234 and the transverse hole 236 when the coupling member 220 is disposed on the lower portion 222 of the tongue 20a.

The first shaft member 252 and the third shaft member 256 cooperate to provide a rigid connection of the coupling member 220 onto the lower portion 222. That is, the coupling member 222 cannot be removed from the lower portion 222 while the first shaft member 252 and the third shaft member 256 are disposed in an installed position as shown in FIGS. 4 and 6.

The second shaft member 254 is disposed generally between the first shaft member 252 and the third shaft member 256 such that an opening 258 is defined between the second shaft member 254 and the second arm member 230 to receive a portion of the hand of an individual to facilitate the installation and removal of the pin 250. The pin 250 can be of unitary construction as best shown in FIG. 6.

Three openings 258, 260 and 262 are provided through the first shaft member 252. The opening 258 is adapted to receive a shank member (not shown) of a lock to provide a theft deterrent when the safety connector 200 is disposed on the tongue 20a of the trailer 22a. The openings 260 and 262 can receive respective pins or other suitable retainers therethrough to maintain the pin 250 in an installed position extending through the aligned apertures 232 and 234, the transverse hole 236, the second aperture 238 and the second transverse hole 240 when the safety connector 200 is installed on the tongue 20a of the trailer 22a. The pin 250 can be formed of a rigid material such as ⅝ inch diameter steel.

To install the safety connector 200 on the tongue 20a when the tongue 20a is attached to the trailer hitch 16, portions of the key-shaped elongated slot 210 near the first end 212 thereof are passed over the first shoulder portion 46 until the base plate 202 is disposed adjacent the medial portion 50. The base plate 202 is then moved towards the trailer 22a until the medial portion 50 is disposed near the second end 208 of the key shaped elongated slot 210 and the gap 118 extends between medial portion 50 and the second end 208. The coupling member 220 is then disposed on the lower portion 222 of the tongue 20a such that aligned apertures 232 and 234 are aligned with the transverse hole 236 and the second aperture 238 is aligned with the second transverse hole 240. In this position, the first shaft member 252 of the pin 250 is positioned through the aligned apertures 232 and 234 and the transverse hole 236, and the third shaft member 256 is positioned through the second aperture 238 and the second transverse hole 240. The lock (not shown) and suitable retaining members can then be inserted through the openings 258, 260 and 262 to maintain the safety connector 200 on the trailer 22a.

It should be noted that the safety connector 200 is preferably mounted such that the base plate 202 is disposed near the central portion 128 between the first and second shoulder portions 46 and 48 of the spool assembly 32 when the towing vehicle 14 and the trailer 22a are disposed on level terrain. This insures that the base plate 202 will have adequate room to travel between the first shoulder portion 46 and the second shoulder portion 48 as the towing vehicle 14 and the trailer 22a are moved about uneven terrain such as steep grades, driveways or curbs.

FIGS. 7–10

Figure 7:
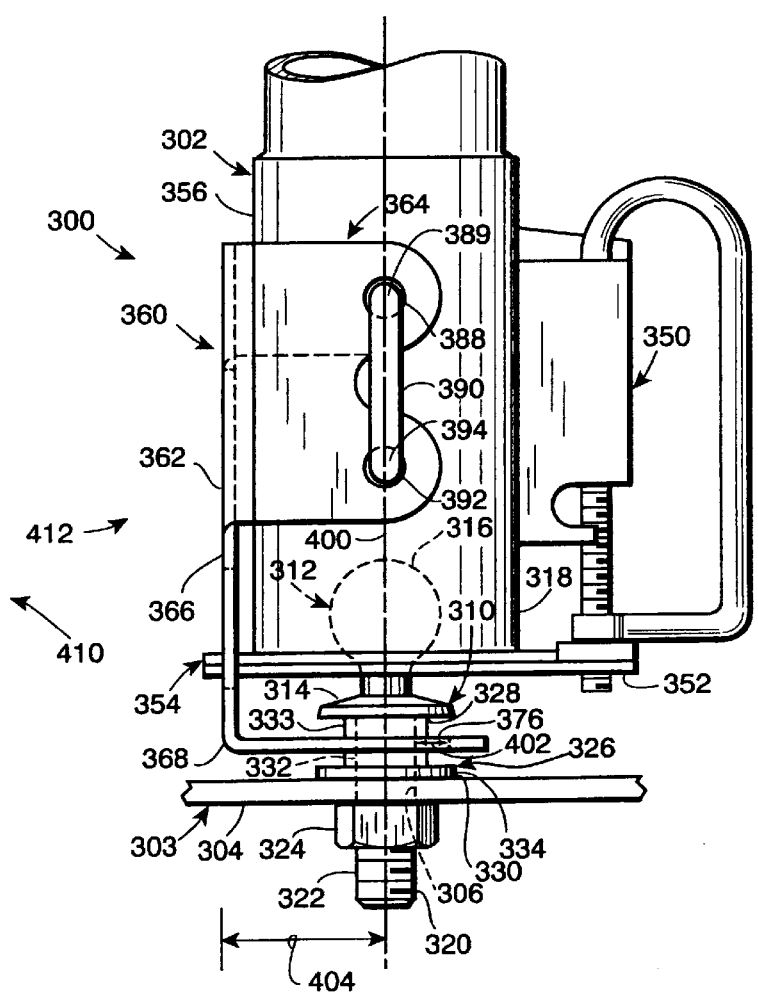
FIG. 7 is a side elevational view of another embodiment of a trailer safety hitch constructed in accordance with the present invention which includes a safety connector positioned on both the tongue of a goose neck trailer, and a trailer hitch assembly mounted to a towing vehicle.

Referring now to FIGS. 7–10 and more particularly to FIG. 7, shown therein and designated by the general reference numeral 300 is another embodiment of the trailer safety hitch for securely mounting a goose neck trailer tongue 302 to a towing vehicle 303. The towing vehicle 303 is shown in FIG. 7 as a substantially planar body member 304. The body member 304 is provided with an aperture 306 formed therethrough. A trailer hitch assembly 310 is disposed through the aperture 306 and mounted to the body member 304.

The trailer hitch assembly 310 is provided with a trailer hitch 312. The trailer hitch 312 has an upper portion 314 which can be disposed in a socket 316 provided in a lower portion 318 of the tongue 302. The trailer hitch 312 is further provided with a lower portion 320 which can be disposed through the aperture 306 such that the lower portion 320 extends a distance from the body member 304 in a direction opposite to that from which the upper portion 314 is disposed, substantially shown in FIG. 7. The trailer hitch 312 can be a commercially available ball type trailer hitch.

The lower portion 320 of the trailer hitch 312 has a threaded exterior surface 322 which can threadingly receive a nut 324 to secure the trailer hitch 312 onto the body member 304.

The trailer hitch assembly 310 is further provided with a spool assembly 326. The spool assembly 326 has a first end 328 and a second end 330. A smooth (unthreaded) central opening 332 is formed through the spool assembly 326 from the first end 328 to the second end 330 thereof. The spool assembly 326 is provided with a cylindrically shaped body portion 333 and an outwardly extending shoulder portion 334 disposed substantially adjacent the second end 330 thereof.

To install the trailer hitch assembly 310 on the body member 304 of the towing vehicle 303, one first disposes the lower portion 320 of the trailer hitch 312 through the smooth central opening 332 of the spool assembly 326 so that the spool assembly 326 is disposed coaxially on the lower portion 320 of the trailer hitch 312. The lower portion 320 is then disposed through the aperture 306 such that the threaded exterior surface 322 extends from the body member 304 in a direction opposite to that in which the upper portion 314 of the trailer hitch 312 is disposed. The nut 324 is then threaded onto the threaded exterior surface 322 to secure the trailer hitch assembly 310 to the body member 304 and thereby sandwich the spool assembly 326 between the body member 304 and the upper portion 314 of the trailer hitch 312, substantially as shown in FIG. 7.

The tongue 302 of the goose neck trailer will now be described. The tongue 302 includes a pinning assembly 350 for securing a moveable base plate 352 in a stable position for securing the trailer hitch 312 to the tongue 302. The base plate 352 is pivotally connected to the tongue 302 via a hinge assembly 354 extending a distance outwardly past an external surface 356 of the tongue 302.

The moveable base plate 352 is provided with a slot (not shown) adapted to receive a portion of the upper portion 314 of the trailer hitch 312, in a manner well known in the art to maintain the trailer hitch 312 in the socket 316. The construction and function of the pinning assembly 350, base plate 352, and hinge assembly 354 are well known to those of ordinary skill in the art. Thus, no more comments concerning the making and use of the goose neck trailer tongue 302 is deemed necessary herein to teach one of ordinary skill in the art how to make and use the present invention.

The trailer safety hitch 300 of the present invention further includes a safety connector 360. The safety connector 360 basically comprises an L-shaped bracket 362 and a connector assembly 364 for rigidly (non-pivotally) connecting the L-shaped bracket 362 to at least a portion of the goose neck trailer tongue 302.

Figure 10:
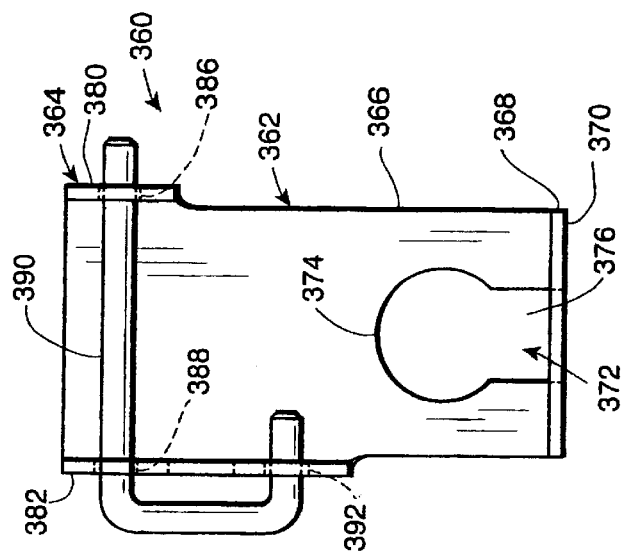
FIG. 10 is a rear view of the safety connector depicted in FIGS. 7, 8 and 9.
Figure 8:
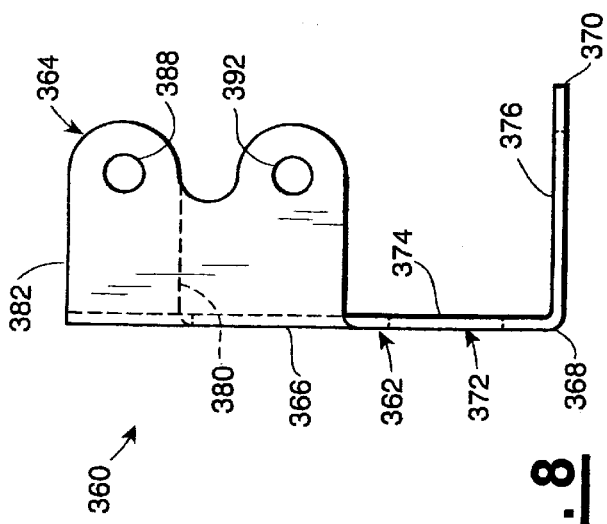
FIG. 8 is a side elevational view of the safety connector depicted in FIG. 7.
Figure 9:
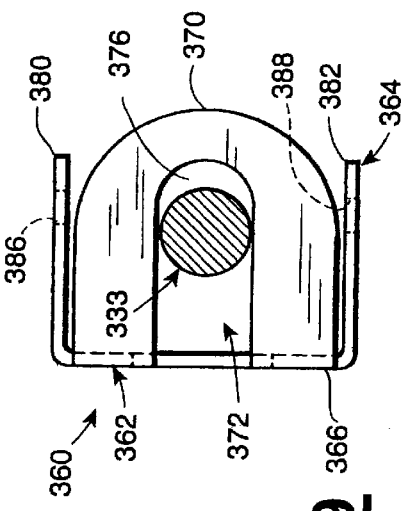
FIG. 9 is a bottom view of the safety connector depicted in FIGS. 7 and 8.

The L-shaped bracket 362 is provided with a first leg 366 having a lower end 368, and a second leg 370 connected to the lower end 368 of the first leg 366 and extending therefrom in a substantially perpendicular direction. The L-shaped bracket 362 has a key shaped slot 372 formed continuously through the first leg 366 and the second leg 370, as best shown in FIGS. 9 and 10.

The key shaped slot 372 is provided with an enlarged first portion 374 (FIGS. 8 and 10) formed in the first leg 366. The enlarged first portion 374 is dimensioned to receive the upper portion 314 of the trailer hitch 312. The key shaped slot 372 is further provided with a reduced second portion 376 (FIGS. 9 and 10) formed in the first leg 366 and the second leg 370. The reduced second portion 376 is provided with a diameter which is less than the diameter of the enlarged first portion 374. The reduced second portion 376 is dimensioned to not pass the upper portion 314 of the trailer hitch 312 therethrough for a purpose to be described hereinafter.

The connector assembly 364 includes a first lug 380 and a second lug 382 extending from the edges of the first leg 366 in the same direction in which the second leg 370 extends from the first leg 366. The first lug 380 and the second lug 382 are spaced a distance 384 apart of about 4 and ¾ inches to receive the external surface 356 of the goose neck trailer tongue 302 therebetween. The first lug 380 and the second lug 382 are disposed in a substantially parallel relationship. The first lug 380 and the second lug 382 are provided with a pair of apertures 386 and 388 formed therethrough which are aligned with a first transverse hole 389 (FIG. 7) formed through the trailer tongue 302 to receive at least a portion of a pin 390 (as shown in FIG. 10) to connect the L-shaped bracket 362 to the goose neck trailer tongue 302 when the trailer safety hitch 300 is in an installed position. The second lug 382 is provided with a second aperture 392 formed therethrough and aligned with a second transverse hole 394 (FIG. 7) formed in the tongue 302 to receive another portion of the pin 390 to maintain the L-shaped bracket 362 in a non-pivotal or stable position on the goose neck trailer tongue 302. It should be noted that the aperture 388 and the second aperture 392 are provided in close proximity of about 3 inch spacing for example. In one embodiment, the aperture 388 and the second aperture 392 can be provided about three inches apart.

Referring now back to FIG. 7, the safety connector 360 is shown in an installed position on the trailer hitch assembly 310 and the goose neck trailer tongue 302. A center line of the hitch assembly 400 is shown in FIG. 7. The aligned apertures 386 and 388, and the second aperture 392 are disposed on the center line 400 of the hitch assembly.

The reduced second portion 376 of the key shaped slot 372 is disposed on the body portion 333 of the spool assembly 326 such that a gap 402 of about ¾ inches is provided between the outer most portion of the cylindrically shaped body portion 333 and the end of the reduced second portion 376 of the key shaped slot 372. The gap 402 permits the safety connector 360 to move about the body portion 333 as the trailer and the towing vehicle 303 are traversing uneven terrain, such as driveways, curbs or hills. However, the close dimensions between the reduced second portion 376 of the key shaped slot 372 and the cylindrically shaped body portion 333 substantially prevents the trailer from rocking, and thus turning over while the trailer is being towed by the towing vehicle 303. That is, the close dimensions between the reduced second portion 376 and the cylindrically shaped body portion 333 causes the L-shaped bracket 362 to engage the cylindrically shaped body portion 333 when the trailer begins to tilt, and thereby exerts an opposite force on the trailer to prevent the trailer from rolling over.

The second leg 370 of the L-shaped bracket 362 is provided with a length 404 extending generally between the center line 400 and the first leg 366. The length 404 should be as small as possible while providing a sufficient length to not interfere with the moveable base plate 352 and the hinge assembly 354 of the goose neck trailer tongue 302. Assuming a 2 and 7/16 inch diameter upper portion 314 of the trailer hitch 312, and a 4 and ½ inch outer diameter 406 of the goose neck trailer tongue 302, the length 404 would be about 2 and ⅝ inches, for example.

To install the safety connector 360 on the goose neck trailer tongue 302 and the trailer hitch assembly 310, the enlarged first portion 374 of the key shaped slot 372 is disposed over the upper portion 314 of the trailer hitch 312 and then lowered until the first leg 366 is disposed on the outwardly extending shoulder portion 334 of the spool assembly 326. The L-shaped bracket 362 is then moved upwardly and outwardly away from the trailer hitch assembly 310 as indicated by the arrow 410 until the L-shaped bracket 362 forms an angle of about 45 degrees between the body member 304 and the first leg 366. In this position, the pinning assembly 350 is manipulated to release the moveable base plate 352 so that the trailer hitch 312 can be disposed in the socket 316 of the goose neck trailer tongue 302. The goose neck trailer tongue 302 is then lowered onto the trailer hitch 312 and at the same time, the L-shaped bracket 362 is rotated upwardly and inwardly substantially in the direction 412 until the goose neck trailer tongue 302 and the safety connector 360 are positioned substantially as shown in FIG. 7. A first portion of the pin 390 is then disposed through the aligned aperture 388, the first transverse hole 389 and the aligned aperture 388, and a second portion of the pin 390 is disposed through the second aperture 392 and the second transverse hole 394 to maintain the safety connector 360 in a stable position on the goose neck trailer tongue 302 and the trailer hitch assembly 310. The moveable base plate 352 of the goose neck trailer tongue 302 is then moved to a locking position and secured via the pinning assembly 350. A lock or other suitable retaining members can then be provided through suitable apertures (not shown) provided in the pin 390 in a similar manner that the openings 258, 260 and 262 are provided in the pin 250 to maintain the pin 390 in a stable position and to prevent the theft of the trailer.

In this position, the goose neck trailer tongue 302 cannot be removed from the trailer hitch assembly 310. That is, if the goose neck trailer tongue 302 moves in an upwardly direction, the second leg 370 will engage the bottom of the upper portion 314 to prevent the removal of the trailer hitch 312 from the socket 316.

The safety connector 360 can be mounted onto the goose neck trailer tongue 302 to prevent theft of the trailer. That is, when the safety connector 360 is installed on the goose neck trailer tongue 302, the second leg 370 extends generally below the socket 316. The reduced second portion 376 of the key shaped slot 372 formed in the second leg 370 is dimensioned to not pass a trailer hitch therethrough, so that the goose neck trailer tongue 302 cannot be connected to a trailer hitch until the safety connector 360 has been removed. It should be noted that a lock or other suitable retainer means can be disposed through portions of the pin 390 extending past the exterior surface 356 to secure the safety connector 360 onto the goose neck trailer tongue 302 as hereinbefore described.

The safety connectors 70, 200 and 360 as hereinbefore described can be fabricated of laser cut steel which is then bent into shape in a manner well known in the art or any other suitable method.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A safety connector for securing a tongue of a trailer to a towing vehicle having a trailer hitch mounting member, the safety connector, comprising:
    a trailer hitch adapted to be secured to the trailer hitch mounting member of the towing vehicle, the trailer hitch having a lower portion adapted to extend a distance below the trailer hitch mounting member when the trailer hitch is secured to the trailer hitch mounting member;
    a spool connected to the lower portion of the trailer hitch such that the spool is positionable below the trailer hitch mounting member, the spool having a first shoulder portion spaced a distance away from the trailer hitch mounting member, and a medial portion positioned in between the first shoulder portion and trailer hitch mounting member, the medial portion having a diameter less than a diameter of the first shoulder portion;
    a base plate connectable to the trailer, the base plate having a thickness less than a length of the medial portion, and a slot formed therethrough, the slot having a width less than the diameter of the first shoulder portion of the spool but greater than the diameter of the medial portion of the spool, and a length greater than the diameter of the medial portion of the spool whereby the base plate is freely slidable along and rotatable about the medial portion of the spool.

2. The safety connector of claim 1 wherein the trailer defines a socket adapted to receive a portion of the trailer hitch, and wherein the safety connector further comprises:
    means, adapted to engage the trailer at such times that the trailer is pinned to the base plate, for limiting pivotation of portions of the trailer, wherein the socket is defined, away from the base plate.

3. The safety connector of claim 1, wherein the lower portion of the trailer hitch and the spool can be threadingly engaged so as to maintain the trailer hitch on the towing vehicle.

4. The safety connector of claim 1, wherein the slot in the base plate is an elongated slot having portions of the slot near a first end thereof dimensioned to pass the first shoulder portion of the spool therethrough and portions of the elongated slot near an opposed second end thereof dimensioned to pass the medial portion therethrough but of insufficient dimensions to pass the first shoulder portion therethrough.

5. The safety connector of claim 1, wherein the medial portion of the spool is generally cylindrically shaped.

6. The safety connector of claim 1, wherein the spool includes a second shoulder portion disposed in between the medial portion and the trailer hitch mounting member the second shoulder portion having a diameter greater than the diameter of the medial portion.

7. The safety connector of claim 1, further comprising:
    a pair of lugs connected to the base plate, the lugs extending upwardly from the base plate in a spaced apart relation such that the trailer can be disposed between the lugs; and
    means for connecting the lugs to the trailer.

8. The safety connector of claim 1, wherein the base plate is adapted to be pivotally connected to the trailer, and wherein the safety connector further comprises:
    pivotational limiting means for preventing pivotation of the tongue of the trailer relative to the base plate sufficient to permit the trailer to lift off the trailer hitch.

9. The safety connector of claim 8, wherein the pivotational limiting means includes:

an upturned heel portion extending from the base plate, the upturned heel portion engaging the trailer when the trailer moves in a direction that would lift the trailer off the trailer hitch.

10. The safety connector of claim 1, further comprising:

a coupling assembly adapted to non-pivotally and removably connect the base plate to at least a portion of the trailer.

11. The safety connector of claim 10, wherein the trailer defines a socket adapted to receive at least a portion of the trailer hitch, and wherein the base plate is constructed to extend forwardly of the coupling assembly so that at least a portion of the base plate can extend generally below the socket provided in the trailer when the base plate is connected to the trailer.

12. The safety connector of claim 11, wherein the coupling assembly further comprises a coupling member shaped to conform to the contours of at least a portion of the trailer.

13. The safety connector of claim 12, wherein the tongue of the trailer includes a first side and a second side which is opposed from the first side thereof, and wherein the coupling member includes a first arm member, and a second arm member, the first and second arm members being spatially disposed and positioned such that the first arm member is disposed substantially adjacent the first side of the tongue, and the second arm member is disposed substantially adjacent the second side of the tongue when the tongue is disposed between the first and second arm members.

14. The safety connector of claim 13, wherein the first arm member has a length which is less than the length of the second arm member.

15. The safety connector of claim 13, wherein the tongue is provided with a first transverse hole formed therethrough, and a second transverse hole with the first transverse hole and the second transverse hole being spatially disposed, and wherein the first arm member is provided with an aperture, and the second arm member is provided with an aperture, the aperture of the first arm member being aligned with the aperture of the second arm member, the apertures of the first and second arm members being aligned with the first transverse hole, the second arm being provided with a second aperture which is simultaneously aligned with the second transverse hole, and wherein the coupling assembly further comprises:

a first shaft member adapted to be positioned through the aligned apertures formed in the first and second arm members and the first transverse hole when the coupling member is disposed on the tongue; and a third shaft member adapted to be positioned through the second aperture and the second transverse hole.

16. The safety connector of claim 15, wherein the coupling assembly further comprises:

a second shaft member disposed generally between the first shaft member and the third shaft member.

17. The safety connector of claim 16, wherein the first, second and third shaft members are integrally constructed to form a unitary structure.

18. A trailer safety hitch for securing a goose-neck trailer tongue having an external surface to a towing vehicle having a trailer hitch mounting member, the goose-neck trailer tongue being disposed in a substantially vertical orientation and having a lower end defining a socket, the trailer safety hitch comprising:

a trailer hitch adapted to be secured to the trailer hitch mounting member of the towing vehicle, at least a portion of the trailer hitch adapted to be disposed in the socket; an L-shaped bracket; and a connector assembly adapted to non-pivotally connect the bracket to the external surface of the goose-neck trailer tongue such that at least a portion of the L-shaped bracket extends below the lower end of the gooseneck trailer tongue.

19. The trailer safety hitch of claim 18, further comprising:

means on the trailer hitch for engaging the bracket to prevent movement of the goose-neck trailer tongue in an upward direction when the socket of the goose-neck trailer tongue is disposed on the trailer hitch, and the bracket is connected to the goose-neck trailer tongue.

20. The trailer safety hitch of claim 18, wherein the L-shaped bracket includes:

a first leg; and a second leg connected to the first leg and extending therefrom, the L-shaped bracket having a key shaped slot formed continuously through the first leg and the second leg, the key shaped slot having an enlarged first portion formed in the first leg, and a reduced second portion formed in the first leg and the second leg, the enlarged first portion being sized to receive the trailer hitch, and the reduced second portion being sized to not pass the trailer hitch.

* * * * *